(12) United States Patent
Tanaka et al.

(10) Patent No.: US 10,911,639 B2
(45) Date of Patent: Feb. 2, 2021

(54) RECORDING APPARATUS AND RECORDING METHOD

(71) Applicant: CANON KABUSHIKI KAISHA, Tokyo (JP)

(72) Inventors: Wakako Tanaka, Inagi (JP); Jumpei Takeichi, Yokohama (JP); Minako Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/515,997

(22) Filed: Jul. 18, 2019

(65) Prior Publication Data

US 2020/0036865 A1  Jan. 30, 2020

(30) Foreign Application Priority Data

Jul. 25, 2018  (JP) .................................. 2018-139503

(51) Int. Cl.
*H04N 1/60* (2006.01)
*B41J 2/135* (2006.01)
*H04N 1/401* (2006.01)

(52) U.S. Cl.
CPC ............... *H04N 1/60* (2013.01); *B41J 2/135* (2013.01); *H04N 1/4015* (2013.01)

(58) Field of Classification Search
CPC ........ H04N 1/60; H04N 1/4015; H04N 1/506; B41J 2/135

USPC .......................................................... 347/43
See application file for complete search history.

(56) References Cited

U.S. PATENT DOCUMENTS 6,025,929 A    2/2000  Nakajima
2013/0293612 A1*  11/2013  Smith .................... B41J 2/2146
                                                               347/14

FOREIGN PATENT DOCUMENTS

JP        2002-37500 A     2/2002

* cited by examiner

*Primary Examiner* — Huan H Tran
*Assistant Examiner* — Alexander D Shenderov
(74) *Attorney, Agent, or Firm* — Canon U.S.A., Inc. I.P. Division

(57) ABSTRACT

A recording apparatus includes a recording unit configured to form an ink image on a transfer body, a conveying unit configured to convey a recording medium, a transfer unit figured to transfer the ink image from the transfer body to the recording medium conveyed by the conveying unit, a reading unit configured to read the recording medium having the ink image transferred thereto, and a post-processing unit configured to apply a pressure to the recording medium having the ink image transferred thereto to perform post-processing for improving a gloss of the ink image on the recording medium. The post-processing unit applies a pressure to a recording medium not to be read by the reading unit, and applies to a recording medium to be read by the reading unit no pressure or a lower pressure than the pressure applied to the recording medium not to be read.

10 Claims, 12 Drawing Sheets

AMOUNT OF SHEET FLOATING
FROM GLASS SURFACE

RECORDING APPARATUS AND RECORDING METHOD

BACKGROUND

Field of the Disclosure

The present disclosure relates to a method for appropriately controlling the post-processing effect and reading accuracy of a recording apparatus.

Description of the Related Art

A recording apparatus performs a large number of processes for reading a recorded product by using a reading unit and performing various corrections and maintenance. An image read by the reading unit is analyzed finely, with correction parameters or sequences of various functions optimized, to produce a recorded product having high image quality. An exemplary process is head shading, as disclosed in U.S. Pat. No. 6,025,929.

Head shading is a process performed in a recording apparatus for high-speed printing with line heads, for correcting perceived density variations, which are caused by different densities of inks ejected onto a recording medium from nozzles having different ejection characteristics.

In a method for head shading, a density variation detection pattern over the width of the line heads is recorded, and the recorded density variation detection pattern is read by a reading device to create a density variation correction parameter.

Various post-processing units are known for performing post-processing on a recorded product, which is recorded by a recording apparatus. Among them, a post-processing unit is available for applying heat or pressure to the recorded product to improve the gloss of the recorded product.

It is known that a recording medium may be curled due to a pressure applied thereto by a post-processing unit.

FIG. 6A illustrates the principle how a recording medium P to which a pressure is applied between a pair of rollers 601 and 602 is curled. In a nip between the rollers 601 and 602, the roller 602 deforms to some extent in accordance with the shape of the other roller 601. The recording medium P is conveyed, with a pressure applied thereto to form an arc in the nip between the rollers 601 and 602. As a result, the recording medium P becomes strongly curled. This characteristic is described in Japanese Patent Laid-Open No. 2002-37500.

FIG. 6B illustrates a recording medium that floats due to being curled between a document table 604 and a pressing plate 603 when the recording medium is read by a reading device. FIG. 6C illustrates a change in read signal value in accordance with the amount by which the recording medium floats from the reading device.

Accordingly, if a high pressure is applied to a recording medium having an image recorded thereon, the recording medium is curled, which potentially results in a reduction in the accuracy of reading a recorded product to be read.

SUMMARY

A recording apparatus according to an aspect of the present disclosure includes a transfer body configured to travel through an ink image forming region and a transfer region, a recording unit configured to eject ink onto the transfer body in the ink image forming region to form an ink image on the transfer body, a conveying unit configured to convey a recording medium, a transfer unit configured to transfer the ink image from the transfer body to the recording medium conveyed by the conveying unit, a reading unit configured to read the recording medium having the ink image transferred thereto, and a post-processing unit configured to apply a pressure to the recording medium having the ink image transferred thereto to perform post-processing for improving a gloss of the ink image on the recording medium. The post-processing unit applies a pressure to a recording medium not to be read by the reading unit, and a recording medium to be read by the reading unit is read by the reading unit under no pressure applied by the post-processing unit or under a lower pressure than the pressure applied to the recording medium not to be read by the reading unit.

Further features of the present disclosure will become apparent from the following description of exemplary embodiments with reference to the attached drawings.

DESCRIPTION OF THE EMBODIMENTS

First Embodiment

Figure 1:
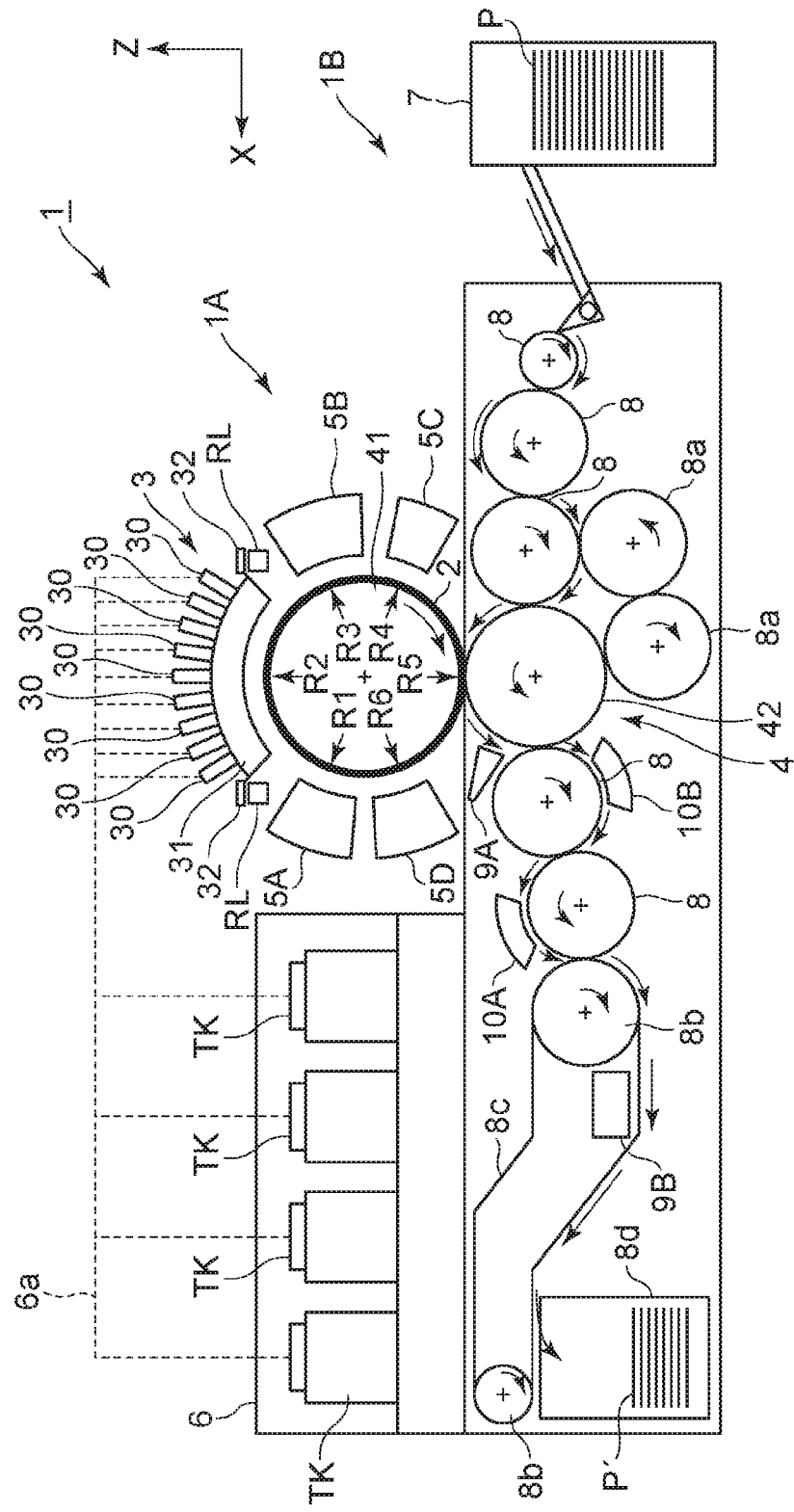
FIG. 1 is a schematic view of a recording system.

An embodiment of the present disclosure will be described with reference to the drawings. In the drawings, arrows X and Y indicate the horizontal direction, and arrow Z indicates the vertical direction. The arrows X and Y are perpendicular to each other.

Recording System

FIG. 1 is a schematic front view of a recording system 1 according to an embodiment of the present disclosure. The recording system 1 is a sheet-fed inkjet printer including a transfer body 2 through which an ink image is transferred onto a recording medium P to produce a recorded product P'. The recording system 1 includes a recording apparatus 1A and a conveying device 1B. In this embodiment, an X direction, a Y direction, and a Z direction refer to a width direction (along the whole length), a depth direction, and a height direction of the recording system 1, respectively. The recording medium P is conveyed in the X direction.

The term "recording" is used to refer to not only forming of meaningful information such as characters and figures but also forming of a wide variety of other information such as images, designs, and patterns, regardless of whether the information is meaningful, or processing of a medium, regardless of whether the information is made to appear so as to be visually perceptible to the human eye. While the term "recording medium" is used to refer to a sheet-like paper product in this embodiment, the term "recording medium" may also be used to refer to any other material such as cloth or a plastic film.

Ink

Components which may be included in ink according to embodiments of the present disclosure will be described.

Coloring Material

The ink according to embodiments of the present disclosure may be a coloring material having dissolved and/or dispersed therein known dyes, carbon black, organic pigments, or the like. Among them, pigments are desirable due offering high durability or quality to recorded products.

Pigments

Non-limiting examples of the pigments that may be used in embodiments of the present disclosure include known inorganic pigments and organic pigments. Specifically, pigments indicated by color index (C.I.) numbers may be used. Carbon black may be used as a black pigment. The pigment content of ink is preferably 0.5% by mass or more and 15.0% by mass or less relative to the total mass of the ink, and more preferably 1.0% by mass or more and 10.0% by mass or less relative to the total mass of the ink.

Pigment Dispersing Agent

The dispersing agent for dispersing a pigment may be any dispersing agent that is available for known inkjet recording. Specifically, a water-soluble dispersing agent having both a hydrophilic moiety and a hydrophobic moiety in the structure thereof may be used in an embodiment of the present disclosure. In particular, a pigment dispersing agent composed of a resin prepared by copolymerization of a mixture containing at least a hydrophilic monomer and a hydrophobic monomer may be used. Each of the monomers, as used here, is not limited to any specific monomer, and may be any known monomer. Specifically, examples of the hydrophobic monomer include styrene, styrene derivatives, alkyl (meth) acrylates, and benzyl (meth)acrylate. Examples of the hydrophilic monomer include acrylic acid, methacrylic acid, and maleic acid.

The dispersing agent may have an acid value of 50 mg KOH/g or more and 550 mg KOH/g or less. The dispersing agent may have a weight-average molecular weight of 1000 or more and 50000 or less.

The ratio of the pigment to the dispersing agent may be in a range of 1:0.1 to 1:3.

In embodiments of the present disclosure, furthermore, a so-called self-dispersible pigment, which is dispersible due to surface modification of a pigment itself without use of a dispersing agent, is also suitable for use.

Resin Fine Particles

The ink according to embodiments of the present disclosure may contain various fine particles having no coloring material. Among them, resin fine particles are suitable because they may have an effect of enhancing image quality or fixability.

The resin fine particles that may be used in embodiments of the present disclosure may be made of any appropriate material, non-limiting examples of which include known resin. Specific examples of the material include homopolymers such as polyolefin, polystyrene, polyurethane, polyester, polyether, polyurea, polyamide, polyvinyl alcohol, poly (meth)acrylic acid and salts thereof, polyalkyl (meth) acrylates, and polydienes, and copolymers including combinations of two or more of these homopolymers. The mass-average molecular weight of the resin desirably falls within a range of 1,000 or more and 2,000,000 or less. The content of the resin fine particles in the ink is preferably 1% by mass or more and 50% by mass or less relative to the total mass of the ink, and more preferably 2% by mass or more and 40% by mass or less relative to the total mass of the ink.

In embodiments of the present disclosure, furthermore, a resin fine particle dispersion may be used which is prepared by dispersing the resin fine particles in a liquid. A so-called self-dispersible resin fine particle dispersion is suitable for use in which a resin prepared by homopolymerization of a monomer having a dissociable group or by copolymerization of a plurality of such monomers is dispersed although the dispersion method is not specifically limited. Examples of the dissociable group include a carboxyl group, a sulfonic acid group, and a phosphoric acid group. Examples of the monomer having the dissociable group include acrylic acid and methacrylic acid. In other embodiments of the present disclosure, a so-called emulsifier dispersed resin fine particle dispersion may be used which is prepared by dispersing resin fine particles with an emulsifier. A known surfactant may be used here as the emulsifier, regardless of whether the molecular weight is low or high. The surfactant is desirably a nonionic surfactant or a surfactant having the same electric charge as the resin fine particles.

The resin fine particle dispersion that is used in embodiments of the present disclosure preferably has a dispersion particle size of 10 mm or more and 1000 nm or less, and more preferably a dispersion particle size of 100 nm or more and 500 nm or less.

When a resin fine particle dispersion that is used in embodiments of the present disclosure is prepared, various additives may be added for stabilization. Examples of the additives include n-hexadecane, dodecyl methacrylate, stearyl methacrylate, chlorobenzene, dodecyl mercaptan, olive oil, blue dye (Blue 70), and polymethyl methacrylate.

Surfactant

The ink that may be used in embodiments of the present disclosure may contain a surfactant. The content of the surfactant in the ink may be 0.01% by mass or more and 5.0% by mass or less relative to the total mass of the ink.

Water and Water-Soluble Organic Solvent

The ink that is used in embodiments of the present disclosure may contain water and/or a water-soluble organic solvent as the solvent. The water may be deionized through ion exchange or the like. The water content in the ink may be 30% by mass or more and 97% by mass or less relative to the total mass of the ink.

The type of the water-soluble organic solvent to be used is not specifically limited, and any known organic solvent may be used. Specific examples of the water-soluble organic solvent include glycerin, diethylene glycol, polyethylene glycol, and 2-pyrrolidone. The content of the water-soluble organic solvent in the ink may be 3% by mass or more and 70% by mass or less relative to the total mass of the ink.

Other Additives

The ink that may be used in embodiments of the present disclosure may also contain various additives such as a pH adjuster, an anticorrosive, a preservative, a fungicide, an antioxidant, a reducing inhibitor, a water-soluble resin and its neutralizer, and a viscosity modifier, in addition to the components described above, as needed.

Recording Apparatus

The recording apparatus 1A includes a recording unit 3, a transfer unit 4, peripheral units 5A to 5D, and a supply unit 6.

Recording Unit

Figure 2:
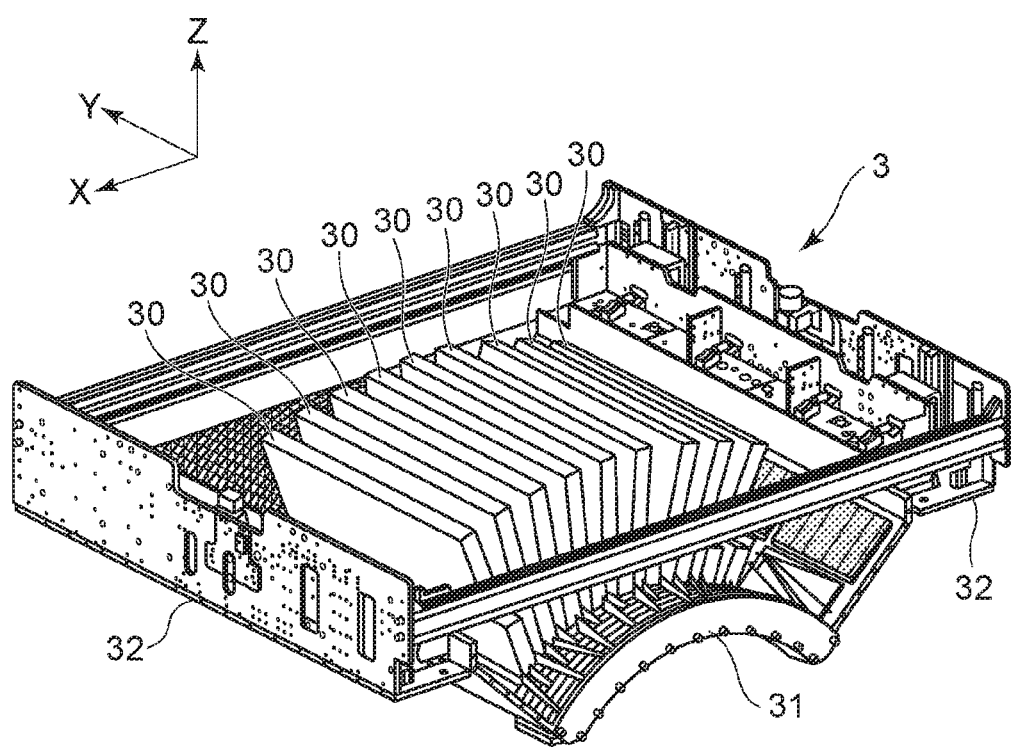
FIG. 2 is a perspective view of a recording unit.

The recording unit 3 includes a plurality of recording heads 30 and a carriage 31. A description will be given with reference to FIGS. 1 and 2. FIG. 2 is a perspective view of the recording unit 3. The recording heads 30 eject liquid ink onto the transfer body 2 that travels through an ink image forming region to form ink images for a recorded image on the transfer body 2.

In this embodiment, the recording heads 30 are full-line heads, each extending in the Y direction and including nozzles arranged so as to cover the width of an image recordable area on a recording medium having a maximum size supported by the recording apparatus 1A. Each of the recording heads 30 has an ink ejection surface on the bottom thereof such that nozzles are open in the ink ejection surface. The ink ejection surfaces and a surface of the transfer body 2 face each other with a fine gap (e.g., several millimeters (mm)) therebetween. In this embodiment, the transfer body 2 is configured to cyclically move in a circular orbit, and the plurality of recording heads 30 are arranged radially.

Each nozzle is provided with an ejection element. The ejection element is an element for, for example, generating a pressure in the nozzle to eject ink from the nozzle, and inkjet head technology for known inkjet printers is applicable. Examples of the ejection element include an element for ejecting ink by an electrothermal converter causing film boiling in the ink to form air bubbles, an element for ejecting ink by using an electromechanical converter, and an element for ejecting ink by using static electricity. In term of high-speed, high-density recording, an ejection element that uses an electrothermal converter can be used.

In this embodiment, nine recording heads 30 are disposed. The recording heads 30 eject different types of inks. The different types of inks are, for example, inks having different coloring materials, such as yellow ink, magenta ink, cyan ink, and black ink. Each of the recording heads 30 ejects one type of ink. However, a single recording head 30 may be configured to eject a plurality of types of inks. When the plurality of recording heads 30 are disposed in the manner described above, some of the recording heads 30 may eject ink (e.g., clear ink) containing no coloring material.

The carriage 31 supports the plurality of recording heads 30. The ends of the recording heads 30 corresponding to the ink ejection surfaces of the recording heads 30 are fixed to the carriage 31. This ensures that the gap between the ink ejection surfaces and the surface of the transfer body 2 can be precisely maintained. The carriage 31 is configured to be guided by guide members RL so that the carriage 31 can be displaced with the recording heads 30 mounted thereon. In this embodiment, the guide members RL are a pair of rail members, each extending in the Y direction, and are spaced apart from each other in the X direction. The carriage 31 is provided with sliding portions 32 in both side portions thereof in the X direction. The sliding portions 32 fit with the guide members RL and slide in the Y direction along the guide members RL.

Figure 12:
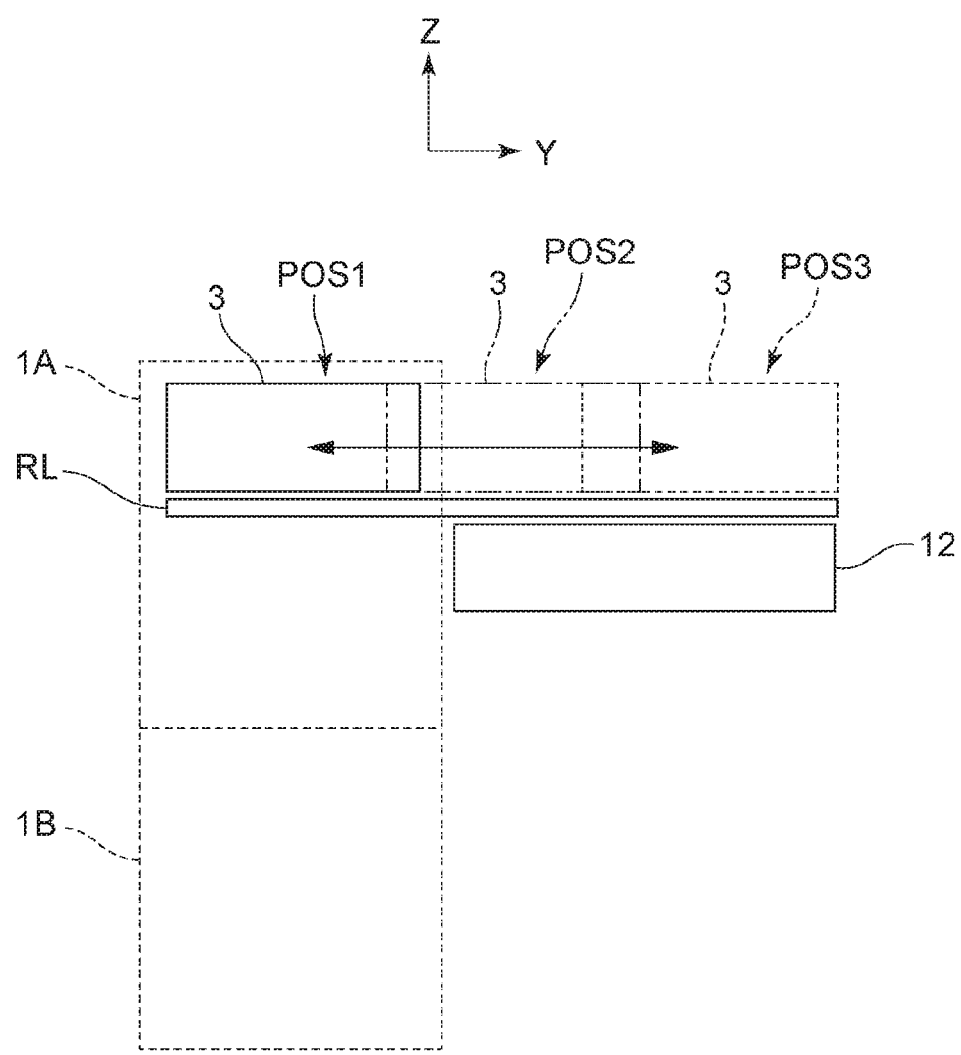
FIG. 12 is a schematic diagram illustrating a displacement mode of the recording unit.

FIG. 12 illustrates a displacement mode of the recording unit 3. In FIG. 12, the right side surface of the recording system 1 is schematically illustrated. A recovery unit 12 is disposed in the rear part of the recording system 1. The recovery unit 12 has a mechanism for recovering the ejection performance of the recording heads 30. Examples of the mechanism include a cap mechanism for capping the ink ejection surfaces of the recording heads 30, a wiper mechanism for wiping the ink ejection surfaces of the recording heads 30, and a suction mechanism for sucking ink from the ink ejection surfaces of the recording heads 30 by negative pressure.

The guide members RL extend across the recovery unit 12 from a side of the transfer body 2. The recording unit 3 is guided by the guide members RL so as to be capable of being displaced between an ejection position POS1 of the recording unit 3, which is indicated by a solid line, and a recovery position POS3 of the recording unit 3, which is indicated by a broken line. The recording unit 3 is driven by a driving mechanism (not illustrated) to move.

The ejection position POS1 is a position at which the recording unit 3 ejects ink onto the transfer body 2 and at which the ink ejection surfaces of the recording heads 30 face the surface of the transfer body 2. The recovery position POS3 is a position at which the recording heads 30 are retracted from the ejection position POS1 and at which the recording unit 3 is located above the recovery unit 12. The recovery unit 12 is capable of executing a recovery process on the recording heads 30 when the recording unit 3 is located at the recovery position POS3. In this embodiment, the recovery unit 12 is also capable of executing a recovery process during the movement of the recording unit 3 before the recording unit 3 reaches the recovery position POS3. A preliminary recovery position POS2 is present between the ejection position POS1 and the recovery position POS3. During the movement of the recording heads 30 from the ejection position POS1 to the recovery position POS3, the recovery unit 12 is capable of executing a preliminary recovery process on the recording heads 30, which are located at the preliminary recovery position POS2.

Transfer Unit

The transfer unit 4 will be described with reference to FIG. 1. The transfer unit 4 includes a transfer cylinder 41 and an impression cylinder 42. Each of the transfer cylinder 41 and the impression cylinder 42 is a rotary body that rotates about a rotary axis extending in the Y direction, and has a cylindrical outer peripheral surface. In FIG. 1, arrows in the shapes of the transfer cylinder 41 and the impression cylinder 42 refer to the rotational directions of the transfer cylinder 41 and the impression cylinder 42. The transfer cylinder 41 rotates clockwise, and the impression cylinder 42 rotates counterclockwise.

The transfer cylinder 41 is a support body that supports the transfer body 2 on the outer peripheral surface thereof. The transfer body 2 is disposed continuously or intermittently in the circumferential direction on the outer peripheral surface of the transfer cylinder 41. When the transfer body 2 is disposed continuously, the transfer body 2 is formed into an endless band shape. When the transfer body 2 is disposed intermittently, the transfer body 2 is formed into a plurality of segments, each shaped into a band having ends, such that the segments can be arranged in a circular arc at equal pitches on the outer peripheral surface of the transfer cylinder 41.

As the transfer cylinder 41 rotates, the transfer body 2 cyclically moves in a circular orbit. The positions of the transfer body 2 can be identified as a pre-ejection processing region R1, an ejection region R2, post-ejection processing regions R3 and R4, a transfer region R5, and a post-transfer processing region R6 in accordance with the rotational phase of the transfer cylinder 41. The transfer body 2 cyclically travels through these regions.

The pre-ejection processing region R1 is a region where the transfer body 2 is subjected to pre-processing before the recording unit 3 ejects ink. In the pre-ejection processing region R1, the peripheral unit 5A performs processing. In this embodiment, a reaction liquid is applied. The ejection region R2 is a formation region where the recording unit 3 ejects ink onto the transfer body 2 to form an ink image on the transfer body 2. The post-ejection processing regions R3 and R4 are processing regions where processing is performed on the ink image after ejection of the ink. In the post-ejection processing region R3, the peripheral unit 5B performs processing. In the post-ejection processing region R4, the peripheral unit 5C performs processing. The transfer region R5 is a region where the transfer unit 4 transfers the ink image on the transfer body 2 onto the recording medium P. The post-transfer processing region R6 is a region where the transfer body 2 is subjected to post-processing after transfer. In the post-transfer processing region R6, the peripheral unit 5D performs processing.

In this embodiment, the ejection region R2 has a certain range. The other regions R1 and R3 to R6 have smaller ranges than the ejection region R2. In this embodiment, assuming numbers on a clock face, the pre-ejection processing region R1 is located at a position approximately corresponding to 10, the ejection region R2 ranges from approximately 11 to 1, the post-ejection processing region R3 is located at a position approximately corresponding to 2, and the post-ejection processing region R4 is located at a position approximately corresponding to 4. The transfer region R5 is located at a position approximately corresponding to 6, and the post-transfer processing region R6 is located at a position approximately corresponding to 8.

The transfer body 2 may be formed of a single layer or may be a multilayer body having a plurality of layers. When the transfer body 2 is formed of a plurality of layers, for example, the transfer body 2 may include three layers, namely, a surface layer, an elastic layer, and a compression layer. The surface layer is the outermost layer having an image-forming surface on which an ink image is formed. The compression layer absorbs deformation, and addresses local pressure fluctuations such that the compression layer disperses the fluctuations, maintaining transferability even during high-speed recording. The elastic layer is a layer between the surface layer and the compression layer.

The surface layer can be made of any of various materials such as resin or ceramics. In terms of durability or the like, the surface layer can be made of a material having a high compressive elastic modulus. Specific examples of the material include acrylic resins, acrylic silicone resin, fluorine-containing resin, and a condensate obtained by condensation of a hydrolyzable organosilicon compound. The surface layer may be subjected to surface treatment for the purpose of improving wettability to the reaction liquid, image transferability, and the like. Examples of the surface treatment include flame treatment, corona treatment, plasma treatment, polishing treatment, roughening treatment, active energy ray irradiation treatment, ozone treatment, surfactant treatment, and silane coupling treatment. A combination of two or more of these treatments may be used. The surface layer may have any desired surface profile.

The compression layer is made of a material such as acrylonitrile-butadiene rubber, acrylic rubber, chloroprene rubber, urethane rubber, or silicone rubber. In the molding of such a rubber material, predetermined amounts of vulcanizing agent, vulcanizing accelerator, and the like may be blended, and a foaming agent and a filler, such as hollow fine particles or table salt, may further be blended, as needed, to form a porous rubber material. Accordingly, air bubbles are compressed with volume change against various kinds of pressure fluctuations, resulting in small deformation in directions other than the direction of compression. This ensures stable transferability and durability. Examples of the porous rubber material include porous rubber materials having an open pore structure in which pores are interconnected, and porous rubber materials having a closed pore structure in which pores are isolated from each other. Any of the pore structures may be used, or both of the pore structures may be used in combination.

The elastic layer may be made of any of various materials such as resin and ceramics, as appropriate. In terms of processing characteristics or the like, various elastomer materials or rubber materials may be used. Specific examples of the material include fluorosilicone rubber, phenyl silicone rubber, fluororubber, chloroprene rubber, urethane rubber, and nitrile rubber. Other examples include ethylene propylene rubber, natural rubber, styrene rubber, isoprene rubber, butadiene rubber, ethylene/propylene/butadiene copolymer, and nitrile butadiene rubber. In particular, due to the low compression set, silicone rubber, fluorosilicone rubber, and phenyl silicone rubber are advantageous in terms of dimensional stability and durability. In addition, due to the small change in elastic modulus with temperature, these rubbers are also advantageous in terms of transferability.

Various adhesives or double-sided tapes may be applied between the surface layer and the elastic layer and between the elastic layer and the compression layer to secure the layers together. The transfer body 2 may further include a reinforcement layer having high compressive elastic modulus to prevent the transfer body 2 from being laterally extended when attached to the transfer cylinder 41 or to maintain the elasticity of the transfer body 2. A woven fabric may be used as a reinforcement layer. The transfer body 2 can be produced by using any combination of the layers made of the materials described above.

The outer peripheral surface of the impression cylinder 42 is pressed against the transfer body 2. The outer peripheral surface of the impression cylinder 42 has at least one gripping mechanism for holding the leading end of the recording medium P. A plurality of gripping mechanisms may be disposed on the impression cylinder 42 so as to be spaced apart from each other in the circumferential direction. The recording medium P is conveyed while being pressed closely against the outer peripheral surface of the impression cylinder 42. When the recording medium P travels through the nip between the impression cylinder 42 and the transfer body 2, the ink image on the transfer body 2 is transferred onto the recording medium P.

Peripheral Units

The peripheral units 5A to 5D are arranged around the transfer cylinder 41. In this embodiment, the peripheral units 5A, 5B, 5C, and 5D are an application unit, an absorption unit, a heating unit, and a cleaning unit, respectively.

The application unit 5A is a mechanism that applies a reaction liquid onto the transfer body 2 before the recording unit 3 ejects ink. The reaction liquid is a liquid containing a component for increasing ink viscosity. The term "increasing ink viscosity" is used to refer to an observed increase in ink viscosity when constituents of ink, such as a coloring material and resin, chemically react or physically adsorb upon contact with a component for increasing ink viscosity. The increase in ink viscosity includes an observed increase in the viscosity of the entire ink, and a local increase in ink viscosity which is caused by aggregation of some of the constituents of the ink such as the coloring material and resin.

Non-limiting examples of the component for increasing ink viscosity include a metal ion and a polymer aggregating agent. A substance that is capable of causing a change in the pH of ink to produce a coloring material aggregate in the ink may be used. An organic acid may be used. Examples of the mechanism that applies a reaction liquid include a roller, a recording head, a die coating device (die coater), and a blade coating device (blade coater). Applying a reaction liquid onto the transfer body 2 before ejection of the ink onto the transfer body 2 provides quick fixation of the ink upon reaching the transfer body 2. This can prevent bleeding of adjacent inks.

The absorption unit 5B is a mechanism that absorbs the liquid component from the ink image on the transfer body 2 before transfer. The reduction in the liquid component of the ink image may prevent blurring or the like of an image to be recorded on the recording medium P. In other words, the reduction in the liquid component may be represented as concentrating the ink with which the ink image on the transfer body 2 can be formed. The term "concentrating the ink" is used to mean that the reduction in the liquid component contained in the ink increases the proportion of solid contents contained in the ink, such as the coloring material or resin, in the liquid component.

The absorption unit 5B includes, for example, a liquid absorbing member that reduces the amount of the liquid component of the ink image in contact with the ink image. The liquid absorbing member may be disposed on the outer peripheral surface of a roller or may be formed into an endless sheet shape so that the liquid absorbing member cyclically travels. In terms of protection of the ink image, the liquid absorbing member may be configured to move at the same speed as the circumferential velocity of the transfer body 2 in synchronization with the transfer body 2.

The liquid absorbing member may include a porous body that comes into contact with the ink image. The porous body may have a pore diameter of 10 µm or less on a surface thereof that comes into contact with the ink image in order to prevent the solid contents in the ink from adhering to the liquid absorbing member. The term "pore diameter", as used here, refers to an average diameter, which can be measured by using a known technique such as mercury intrusion, nitrogen adsorption, or scanning electron microscopy (SEM) image observation. The liquid component is not limited and may be any fluid matter having no fixed shape but a substantially fixed volume. Examples of the liquid component include water and an organic solvent, which are contained in the ink or reaction liquid.

The heating unit 5C is a mechanism that heats the ink image on the transfer body 2 before transfer. Heating the ink image makes the resin in the ink image melt, improving transferability to the recording medium P. The heating temperature may be equal to or higher than the minimum film-forming temperature (MFT) of the resin. The MFT can be measured using a known technique, for example, using a device complying with JIS K 6828-2: 2003 or ISO 2115: 1996. In terms of transferability and image fastness, the ink image may be heated at a temperature higher than the MFT by 10° C. or more, or may be heated at a temperature higher than the MFT by 20° C. or more. Examples of the heating unit 5C include various lamps, such as infrared lamps, and known heating devices, such as warm-air fans. In terms of heating efficiency, an infrared heater can be used.

The cleaning unit 5D is a mechanism that cleans the transfer body 2 after transfer. The cleaning unit 5D removes ink residue or dust from the transfer body 2. Examples of the cleaning unit 5D include devices that use known methods such as urging a porous member into contact with the transfer body 2, cleaning the surface of the transfer body 2 with a brush, and scraping the surface of the transfer body 2 with a blade, as needed. A cleaning member having a known shape such as a roller or a web may be used for cleaning.

As described above, in this embodiment, the application unit 5A, the absorption unit 5B, the heating unit 5C, and the cleaning unit 5D are included as peripheral units. Some of the peripheral units may have a function of cooling the transfer body 2, or a cooling unit may be additionally included. In this embodiment, heat from the heating unit 5C may cause the temperature of the transfer body 2 to rise. After the recording unit 3 ejects ink onto the transfer body 2, if the temperature of the ink image exceeds the boiling point of water, which is main solvent of the ink, the ability of the absorption unit 5B to absorb the liquid component may deteriorate. The transfer body 2 is cooled so that the ejected ink can be kept at a temperature less than the boiling point of water, thereby maintaining the liquid component absorbing ability.

The cooling unit may be an air blowing mechanism that blows air to the transfer body 2 or a mechanism that brings a member (e.g., a roller) into contact with the transfer body 2 to cool the member by air cooling or water cooling. Alternatively, the cooling unit may be a mechanism that cools the cleaning member of the cleaning unit 5D. The cooling operation may be performed during a period before the application of the reaction liquid after transfer.

Supply Unit

The supply unit 6 is a mechanism that supplies inks to the recording heads 30 of the recording unit 3. The supply unit 6 may be located in a rear portion of the recording system 1. The supply unit 6 includes reservoirs TK, for the respective ink types, for storing inks. Each of the reservoirs TK may be constituted by a main tank and a sub-tank. The reservoirs TK and the recording heads 30 communicate with each other via a fluid passage 6a, and ink is supplied from each of the reservoirs TK to a corresponding one of the recording heads 30. The fluid passage 6a may be a fluid passage through which inks circulate between the reservoirs TK and the recording heads 30, and the supply unit 6 may include a pump or the like that allows ink to circulate. A degeneration mechanism may be disposed in the middle of the fluid passage 6a or in each of the reservoirs TK to remove air bubbles in the ink. A valve may be disposed in the middle of the fluid passage 6a or in each of the reservoirs TK for adjustment between the hydraulic pressure of the ink and the atmospheric pressure. The heights of the reservoirs TK and the recording heads 30 in the Z direction may be designed so that the position of the liquid surface of the ink in each of the reservoirs TK is lower than that of the ink ejection surface of the corresponding one of the recording heads 30.

Conveying Device

The conveying device 1B is a device that feeds the recording medium P to the transfer unit 4 and that discharges a recorded product P' having an ink image transferred thereto from the transfer unit 4. The conveying device 1B includes a feeding unit 7, a plurality of conveying cylinders 8 and 8a, two sprockets 8b, a chain 8c, and a collection unit 8d. In FIG. 1, arrows in the shapes of the components of the conveying device 1B indicate the rotational directions of the components, and arrows outside the shapes of the components indicate the conveyance path of the recording medium P or the recorded product P'. The recording medium P is conveyed from the feeding unit 7 to the transfer unit 4, and the recorded product P' is conveyed from the transfer unit 4 to the collection unit 8*d*. The side of the conveying device 1B closer to the feeding unit 7 is referred to sometimes as the upstream side in the conveyance direction, and the side of the conveying device 1B closer to the collection unit 8*d* is referred to sometimes as the downstream side in the conveyance direction.

The feeding unit 7 includes a stack in which a plurality of recording media P are stacked on top of each other, and a feeding mechanism that feeds the recording media P one by one from the stack to the most upstream one of the conveying cylinders 8. Each of the conveying cylinders 8 and 8*a* is a rotary body that rotates about a rotary axis extending in the Y direction, and has a cylindrical outer peripheral surface. The outer peripheral surface of each of the conveying cylinders 8 and 8*a* has at least one gripping mechanism for holding the leading end of the recording medium P (or the recorded product P'). The gripping and releasing operations of the gripping mechanisms are controlled so that the recording medium P can be transferred between adjacent conveying cylinders.

The two conveying cylinders 8*a* are conveying cylinders for reversing the recording medium P. In double-sided recording of the recording medium P, after transfer onto the front side of the recording medium P, the recording medium P is not passed from the impression cylinder 42 to the conveying cylinder 8 adjacent thereto on the downstream side, but is passed to the conveying cylinders 8*a*. The recording medium P, which is turned upside down through the two conveying cylinders 8*a*, is passed to the impression cylinder 42 again via the conveying cylinder 8 located upstream of the impression cylinder 42. This allows the back side of the recording medium P to face the transfer cylinder 41, and the ink image is transferred onto the back side of the recording medium P.

The chain 8*c* is wound between the two sprockets 8*b*. One of the two sprockets 8*b* is a driving sprocket, and the other is a driven sprocket. As the driving sprocket rotates, the chain 8*c* cyclically travels. The chain 8*c* is provided with a plurality of gripping mechanisms that are spaced apart from each other in the longitudinal direction thereof. The gripping mechanisms grasp the edges of the recorded product P'. The recorded product P' is passed from the downstream end conveying cylinder 8 to the gripping mechanisms of the chain 8*c*. As the chain 8*c* travels, the recorded product P', which is grasped by the gripping mechanisms, is conveyed to the collection unit 8*d*, and the grasp is released. Consequently, the recorded product P' is stacked in the collection unit 8*d*.

Post-Processing Unit

The conveying device 1B further includes post-processing units 10A and 10B. The post-processing units 10A and 10B are mechanisms located downstream of the transfer unit 4 to perform post-processing on the recorded product P'. The post-processing unit 10A performs processing on the front side of the recorded product P', and the post-processing unit 10B performs processing on the back side of the recorded product P'. Examples of the processing include applying coating to the image-recorded surface of the recorded product P' for purposes such as protecting the image or giving a glossy appearance. Examples of the coating include application of liquid, sheet welding, and lamination.

Examples of the post-processing to be performed by the post-processing unit 10A on the surface of the recorded product P' include surface glossing, which will be described in detail.

Figure 8:
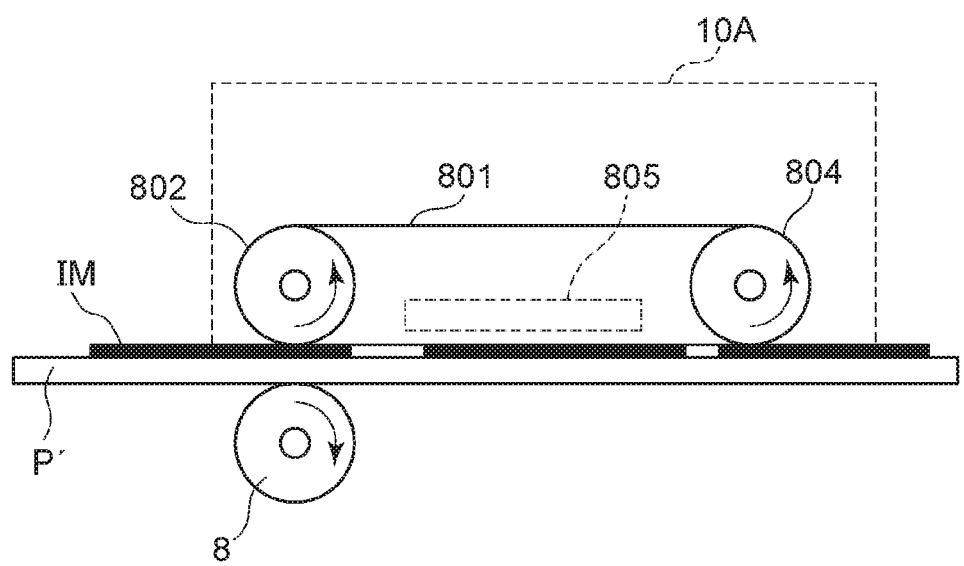
FIG. 8 is a schematic diagram of a post-processing unit.

FIG. 8 illustrates an endless press method, which is one of the surface glossing procedures. The endless press method involves applying a pressure to a surface of the recorded product P' while heating the surface of the recorded product P', cooling the surface of the recorded product P', and then peeling off the recorded product P'.

A fixing belt 801, which is wound around a heat- and pressure-applying roller 802, and the conveying cylinder 8 come into contact with each other, and an ink image IM formed on the recorded product P' passes through the space between the heat- and pressure-applying roller 802 and the conveying cylinder 8. The fixing belt 801 is wound around the heat- and pressure-applying roller 802 and a peel-off roller 804. The fixing belt 801 and the ink image IM formed on the recorded product P' remain in contact with each other until the recorded product P' reaches the position of the peel-off roller 804. A cooling device 805 is disposed between the heat- and pressure-applying roller 802 and the peel-off roller 804. When the recorded product P' reaches the position of the peel-off roller 804, the ink image IM has been cooled, thus making it possible to peel off the ink image IM and the fixing belt 801 from each other at a low temperature. The temperature for fixing is set to be sufficiently higher than the MFT of the resin fine particles contained in the ink. In this embodiment, by way of example, the temperature is 140° C., and the pressure to be applied is 10 kgf/cm$^2$. Further, the time period during which the ink image IM is nipped between the heat- and pressure-applying roller 802 and the conveying cylinder 8 through the fixing belt 801 can be set as appropriate and is 900 msec in this embodiment.

The series of processes described above is performed to obtain a recorded product having high gloss. The endless press method enables peeling off at a low temperature, and is more likely to provide a high-gloss appearance than the roller nip method that does not involve the fixing belt 801 or the cooling device 805. A heating device may additionally be disposed between the heat- and pressure-applying roller 802 and the cooling device 805.

Inspection Unit

The conveying device 1B further includes inspection units 9A and 9B. The inspection units 9A and 9B are mechanisms located downstream of the transfer unit 4 to inspect the recorded product P'.

In this embodiment, the inspection unit 9A is an imaging device that captures an image recorded on the recorded product P'. For example, the inspection unit 9A includes an imaging element such as a charge-coupled device (CCD) sensor or a complementary metal-oxide-semiconductor (CMOS) sensor. The inspection unit 9A captures a recorded image during a continuous recording operation. A change in the tint or the like of the recorded image with time is checked based on the image captured by the inspection unit 9A to determine whether image data or recorded data can be corrected. In this embodiment, the inspection unit 9A has an imaging range that is set for the outer peripheral surface of the impression cylinder 42 and is arranged so that part of a recorded image can be captured immediately after transfer. The inspection unit 9A may inspect all recorded images or may inspect every predetermined number of recorded images.

In this embodiment, the inspection unit 9B is also an imaging device that captures an image recorded on the recorded product P', and includes, for example, an imaging element such as a CCD sensor or a CMOS sensor. The inspection unit 9B captures a recorded image in a test recording operation. The inspection unit 9B captures the entire recorded image. Based on the image captured by the inspection unit 9B, basic settings for various corrections regarding recorded data can be performed. In this embodiment, the inspection unit 9B is arranged at a position at which the recorded product P' conveyed by the chain 8c is captured. The inspection unit 9B may be a scanner that scans over the recorded product P'.

Figure 7A:
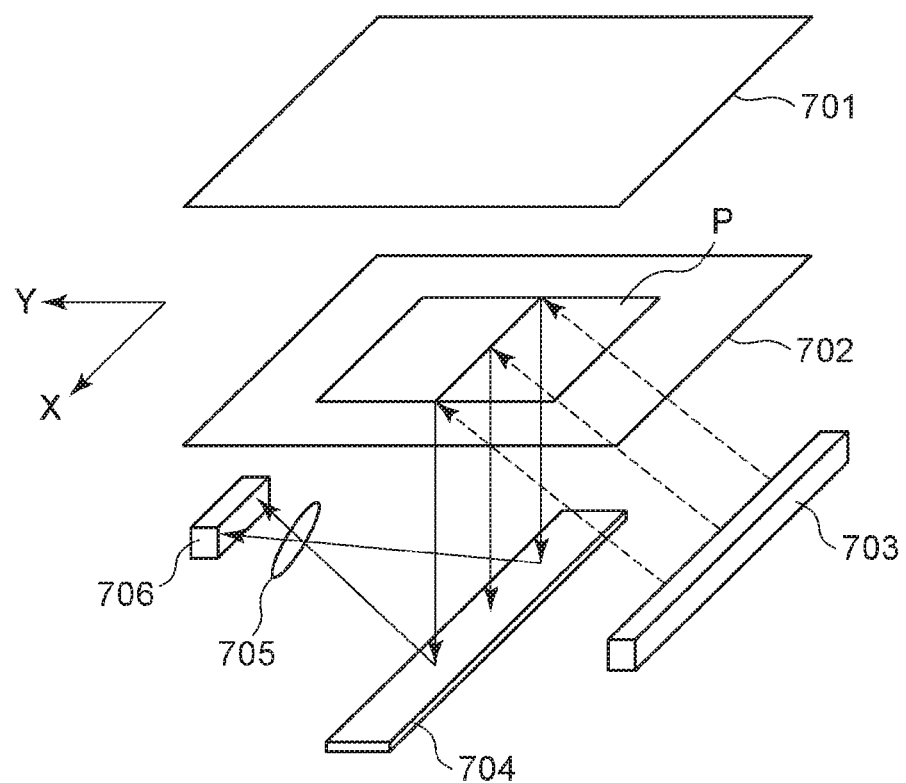
FIGS. 7A and 7B are schematic diagrams illustrating an overview of the configuration of a scanner.

FIG. 7A illustrates a configuration of a scanner serving as the inspection unit 9B.

The scanner includes a document table 702 on which the recording medium P is placed, a pressing plate 701 that presses the recording medium P from the top, a light source 703, a mirror 704, a condenser lens 705, and a sensor 706.

When the recording medium P conveyed in the X direction is placed on the document table 702, the chain 8c is temporarily stopped from traveling, and the units, namely, the light source 703, the mirror 704, the condenser lens 705, and the sensor 706, scan in the Y direction.

The light source 703 is a white light-emitting diode (LED) light source. Light transmitted through the document table 702, which is made of glass, and reflected from the recording medium P is bent by the mirror 704, condensed by the condenser lens 705, and then detected by the sensor 706.

The sensor 706 reads reflected light as a red-green-blue (RGB) three-channel signal.

In FIG. 7A, an optical system has been described in the context of a single mirror. Alternatively, a plurality of mirrors may be used in combination to concentrate light.

Figure 7B:

FIG. 7B illustrates the recording medium P, which is pressed by the pressing plate 701, when viewed in the X direction.

Control Unit

Figure 3:
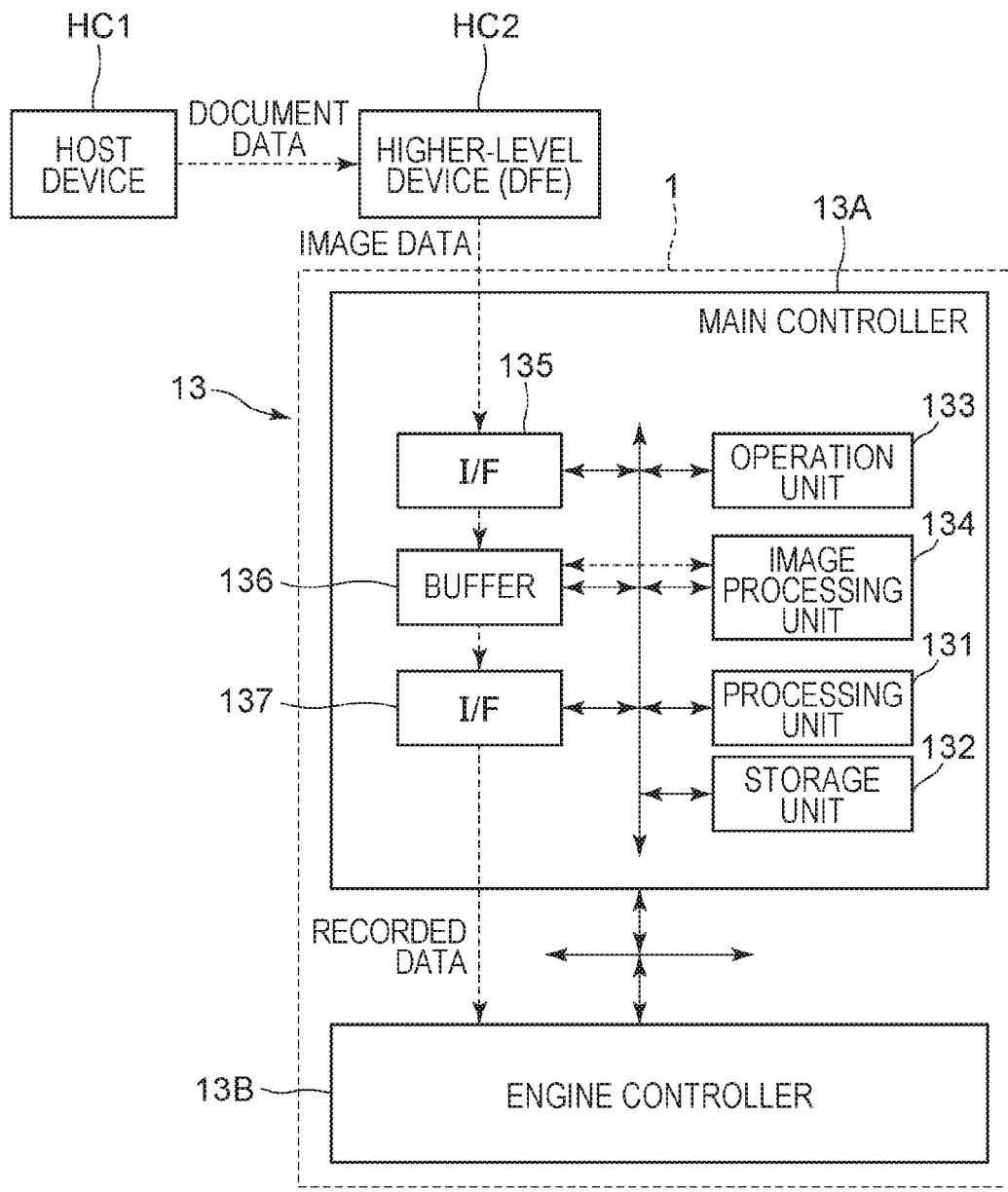
FIG. 3 is a block diagram of a control system in the recording system illustrated in FIG. 1.
Figure 4:
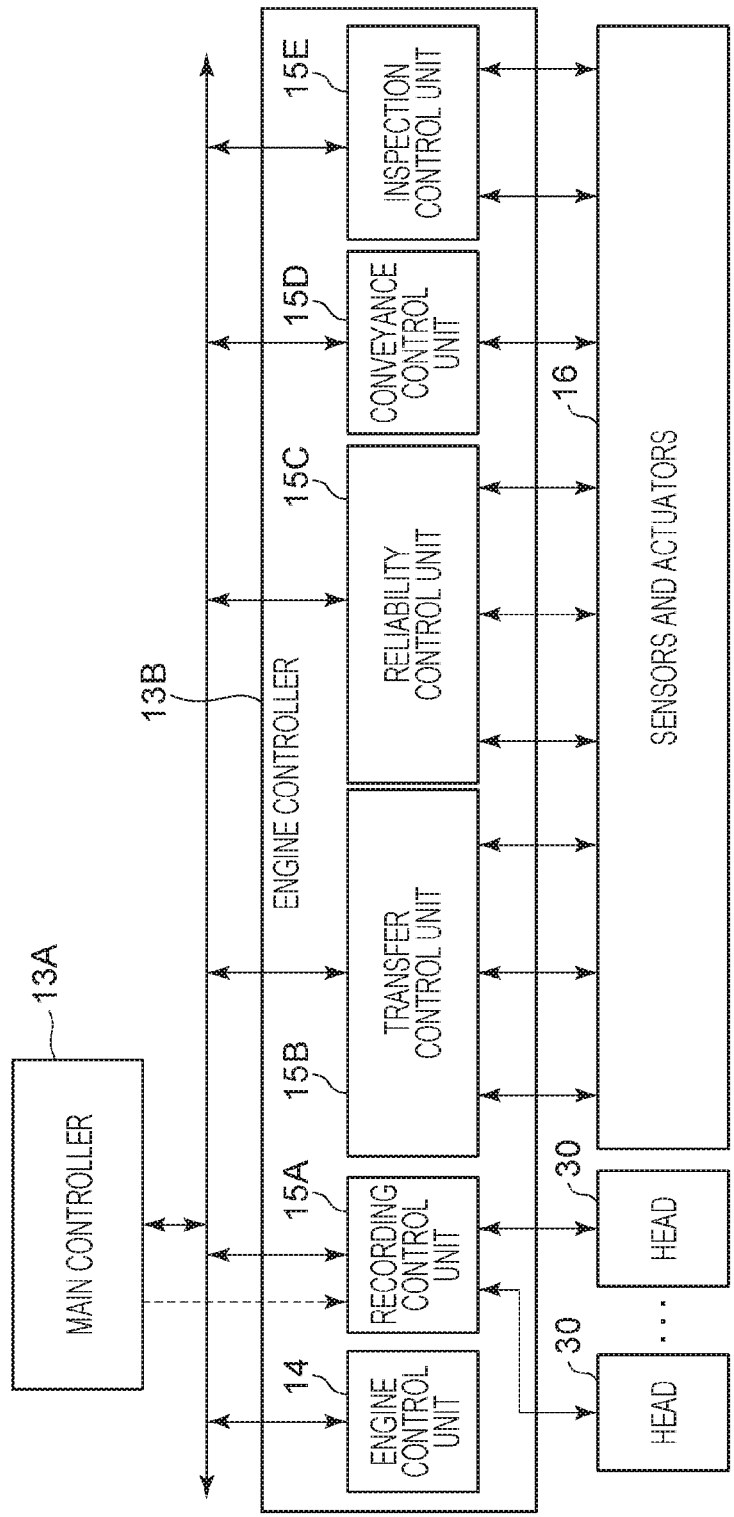
FIG. 4 is a block diagram of the control system in the recording system illustrated in FIG. 1.

Next, a control unit for the recording system 1 will be described. FIGS. 3 and 4 are block diagrams of a control unit 13 for the recording system 1. The control unit 13 is connected to a higher-level device (Digital Front End (DFE)) HC2 so that the control unit 13 can communicate with the higher-level device HC2. The higher-level device HC2 is connected to a host device HC1 so that the higher-level device HC2 can communicate with the host device HC1.

The host device HC1 generates or stores source document data from which a recorded image is created. The document data is generated in an electronic file format such as a document file format or an image file format. The document data is transmitted to the higher-level device HC2. The higher-level device HC2 converts the received document data into a data format available for the control unit 13 (e.g., RGB data representing an image in RGB). The converted data is transmitted from the higher-level device HC2 to the control unit 13 as image data. The control unit 13 starts a recording operation based on the received image data.

In this embodiment, the control unit 13 is roughly separated into a main controller 13A and an engine controller 13B. The main controller 13A includes a processing unit 131, a storage unit 132, an operation unit 133, an image processing unit 134, a communication interface (I/F) 135, a buffer 136, and a communication I/F 137.

The processing unit 131 is a processor such as a central processing unit (CPU). The processing unit 131 executes a program stored in the storage unit 132 to control the overall operation of the main controller 13A. The storage unit 132 is a storage device such as a random access memory (RAM), a read-only memory (ROM), a hard disk, or a solid-state drive (SSD). The storage unit 132 stores a program to be executed by the CPU 131 and data, and further provides a work area for the CPU 131. The operation unit 133 is an input device including a touch panel, a keyboard, and a mouse, and is configured to receive instructions from a user.

The image processing unit 134 is, for example, an electronic circuit including an image processing processor. Examples of the buffer 136 include a RAM, a hard disk, and an SSD. The communication I/F 135 communicates with the higher-level device HC2, and the communication I/F 137 communicates with the engine controller 13B. In FIG. 3, broken-line arrows indicate an exemplary process flow of image data. The image data received from the higher-level device HC2 via the communication I/F 135 is accumulated in the buffer 136. The image processing unit 134 reads the image data from the buffer 136, performs predetermined image processing on the read image data, and stores the resulting image data in the buffer 136 again. The image data subjected to image processing, which is stored in the buffer 136, is transmitted from the communication I/F 137 to the engine controller 13B as recorded data to be used by a print engine.

Figure 9:
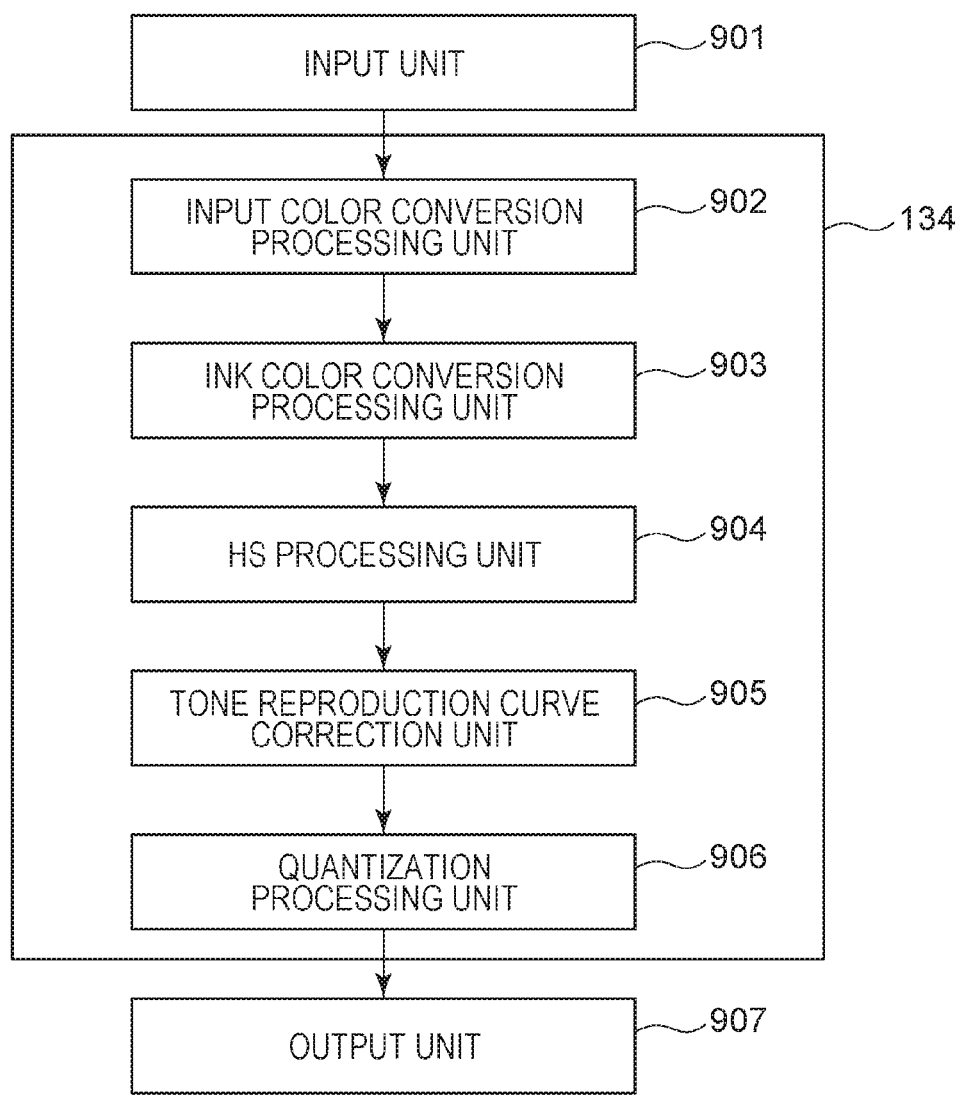
FIG. 9 is a flow diagram of a printing process performed by an image processing unit.

FIG. 9 is a flow diagram illustrating processes perforated in the image processing unit 134. The functions of the image processing unit 134 will be described as being executed by corresponding function units.

An input unit 901 receives the image data transmitted from the buffer 136 and passes the image data to the image processing unit 134. The image processing unit 134 includes an input color conversion processing unit 902, an ink color conversion processing unit 903, a head shading (HS) processing unit 904, a tone reproduction curve correction unit 905, and a quantization processing unit 906.

The input color conversion processing unit 902 converts the image data input from the input unit 901 into image data corresponding to the color reproduction area of the recording apparatus 1A. In this embodiment, the input image data is 8-bit data indicating each of the color coordinates (R, G, B) in a color space, such as the sRGB color space, in which a monitor represents colors. The input color conversion processing unit 902 converts the input image data (R, G, B) into 8-bit image data for each of (R', G', B') in the color reproduction area of the recording apparatus 1A by using a known technique such as matrix operation processing or processing using a three-dimensional lookup table. In this embodiment, a three-dimensional lookup table is used together with interpolation operation to perform a conversion process. The 8-bit image data handled in the image processing unit 134 has a resolution of 600 dpi, and binary data obtained by quantization in the quantization processing unit 906 has a resolution of 1200 dpi, as described below.

The ink color conversion processing unit 903 converts 8-bit image data for each of (R', G', B'), which is processed by the input color conversion processing unit 902, into image data for inks used in the recording apparatus 1A. In this embodiment, the recording apparatus 1A uses black (K), cyan (C), magenta (M), and yellow (Y) inks. Thus, image data of RGB signals is converted into image data that includes 8-bit color signals for K, C, M, and Y. This color conversion is also performed by using a three-dimensional lookup table together with interpolation operation in a way similar to that in the input color conversion processing unit 902 described above. A technique such as the matrix operation processing described above may be used.

The HS processing unit 904 receives the 8-bit color signals for K, C, M, and Y and performs a process to convert the 8-bit data for each ink color into image data of an ink color signal in accordance with the characteristics of the nozzles of the corresponding recording head, such as the amount of ejection. As a result, image data conversion is implemented such that the density of the image is corrected in accordance with the characteristics of each nozzle, such as the amount of ejection, providing recording with uniform density in the Y direction with the density variations due to the ejection characteristics reduced. In this embodiment, a one-dimensional lookup table is used to perform processing.

The tone reproduction curve correction unit 905 adjusts the number of dots to be recorded by an output unit 907 for each ink color in response to image data that includes the respective 8-bit ink color signals subjected to HS processing. In some cases, the relationship between the number of dots to be recorded on a recording medium and the lightness thereof is not linear. The tone reproduction curve correction unit 905 corrects the 8-bit image data for each ink color so as to obtain a linear relationship, and adjusts the number of dots to be recorded on the recording medium.

The quantization processing unit 906 is a processing unit that performs a quantization process on the 8-bit image data for each ink color, which is processed by the tone reproduction curve correction unit 905, to obtain 1-bit binary data. In this embodiment, first, the 8-bit image data is converted into 3-bit 5-valued index data 0 to 4 for each ink color. The index data 0 to 4 corresponds to a pattern in which 0 to 4 dots are arranged in a grid of 2×2 pixels at a resolution of 1200 dpi. The configuration of the quantization processing unit 906 is not limited to that in this example, and the quantization processing unit 906 may be configured to, for example, directly binarize 8-bit image data to obtain whether to eject ink. While dithering is used as a method for quantization processing in this embodiment, any other quantization technique such as error diffusion may be used.

The output unit 907 drives the recording heads to eject inks of the respective colors onto the recording medium on the basis of the dot data obtained by quantization to perform recording. Specifically, the output unit 907 is constituted by the recording system 1 illustrated in FIG. 1.

As illustrated in FIG. 4, the engine controller 13B includes control units 14 and 15A to 15E, and is configured to obtain detection results of sensors and actuators 16 included in the recording system 1 and to control the driving of the sensors and actuators 16. Each of the control units 14 and 15A to 15E includes a processor such as a CPU, a storage device such as a RAM or a ROM, and an interface with an external device. The individual control units are for illustrative purposes, and some control operations may be performed by a plurality of sub-control units, or a plurality of control units may be combined into a single control unit that perform the control operations of the plurality of control units.

The engine control unit 14 controls the overall operation of the engine controller 13B. The recording control unit 15A converts recorded data received from the main controller 13A into a data format suitable to drive the recording heads 30, such as a raster data format. The recording control unit 15A controls ejection of the recording heads 30.

The transfer control unit 15B controls the application unit 5A, the absorption unit 5B, the heating unit 5C, and the cleaning unit 5D.

The reliability control unit 15C controls the supply unit 6, the recovery unit 12, and a driving mechanism. The driving mechanism drives the recording unit 3 to shift between the ejection position POS1 and the recovery position POS3.

The conveyance control unit 15D controls the conveying device 1B. The inspection control unit 15E controls the inspection unit 9B and the inspection unit 9A.

Among the sensors and actuators 16, the sensors include a sensor that detects the position or speed of a movable unit, a sensor that detects a temperature, an imaging element, and so on. The actuators include a motor, an electromagnetic solenoid, an electromagnetic valve, and so on.

Example Operation

Figure 5:
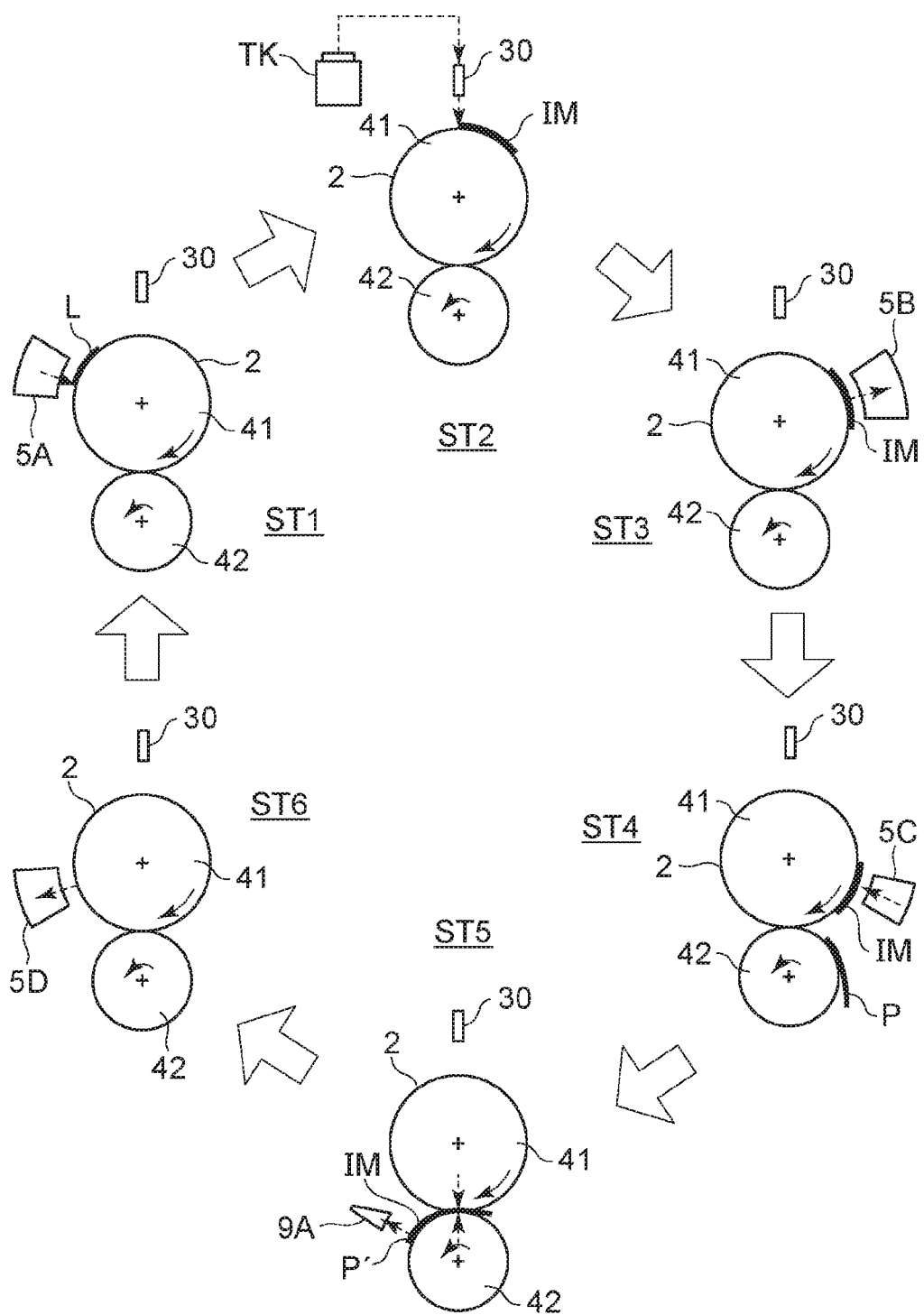
FIG. 5 illustrates an example operation of the recording system illustrated in FIG. 1.
Figure 6A:
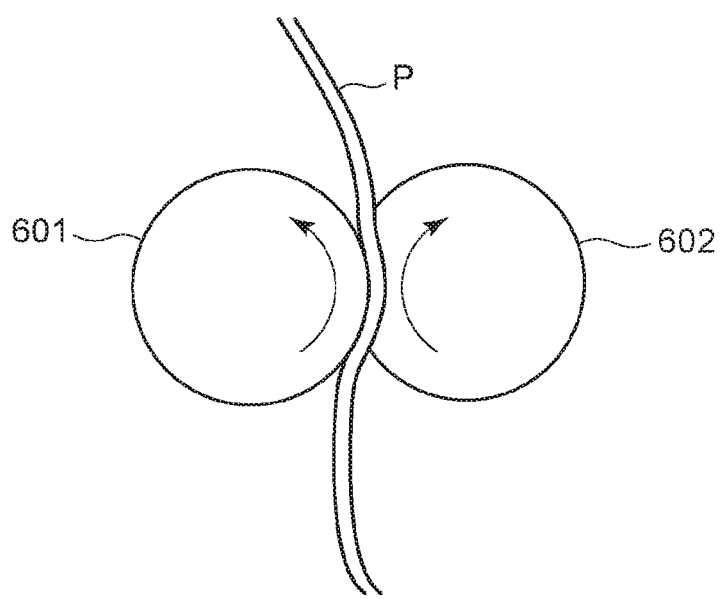
FIGS. 6A to 6C are schematic diagrams illustrating a curl of a recording medium and the accuracy of reading the recording medium.
Figure 6B:
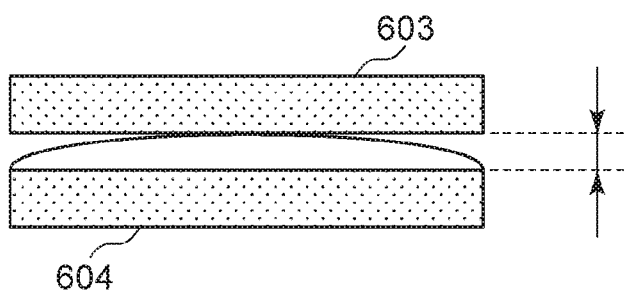
Figure 6C:
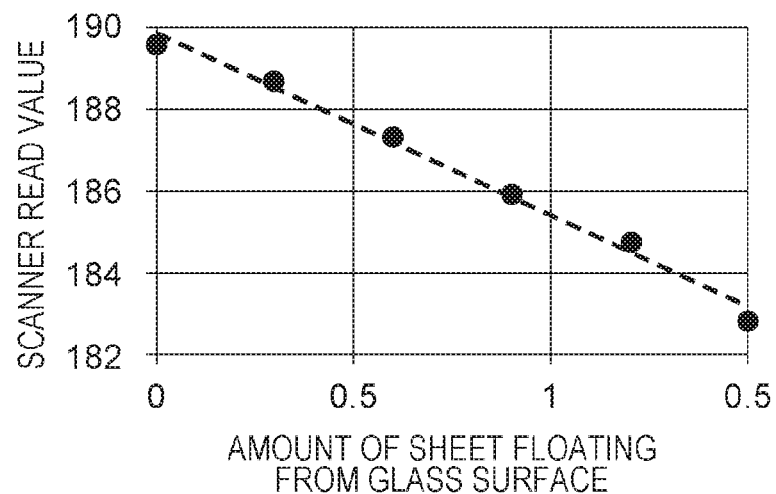

FIG. 5 schematically illustrates an example recording operation. The following steps are cyclically performed, with the transfer cylinder 41 and the impression cylinder 42 rotated.

State ST1 indicates a state in which a reaction liquid L is applied onto the transfer body 2 from the application unit 5A. A portion of the transfer body 2 onto which the reaction liquid L is applied moves in accordance with the rotation of the transfer cylinder 41.

State ST2 indicates a state in which the portion of the transfer body 2 onto which the reaction liquid L is applied in the state ST1 reaches a position below a recording head 30 and in which ink is ejected from the recording head 30 to the transfer body 2. As a result, an ink image IM is formed. A mixture of the ejected ink and the reaction liquid L on the transfer body 2 promotes aggregation of the coloring material. The ejected ink is supplied from a reservoir TK of the supply unit 6 to the recording head 30.

State ST3 indicates a state in which the ink image IM on the transfer body 2 moves in accordance with the rotation of the transfer body 2 and reaches the absorption unit 5B. In this state, the absorption unit 5B absorbs the liquid component from the ink image IM.

State ST4 indicates a state in which the ink image IM reaches the heating unit 5C. In this state, the ink image IM is heated, and the resin in the ink image IM melts to form a film of the ink image IM. In synchronization of the formation of the ink image the recording medium P is conveyed by the conveying device 1B.

State ST5 indicates a state in which the ink image IM and the recording medium P reach the nip between the transfer body 2 and the impression cylinder 42. In this state, the ink image IM is transferred onto the recording medium P to produce a recorded product P'. After the recorded product P' passes through the nip, an image of the recorded product P' is captured by the inspection unit 9A and the recorded image is inspected. The recorded product P' is conveyed by the conveying device 1B to the post-processing units 10A and 10B described above for post-processing and to the inspection unit 9B for scanning, as needed. Then, the recorded product P' is conveyed to the collection unit 8d.

State ST6 indicates a state in which the portion of the transfer body 2 on which the ink image IM is formed reaches the cleaning unit 5D. In this state, the portion on which the ink image IM is formed is cleaned by the cleaning unit 5D. After cleaning, the transfer body 2 has rotated one full turn. Ink images are repeatedly transferred onto the recording medium P in a similar procedure. In the foregoing description, an ink image IM is transferred onto a single recording medium P once through one turn of the transfer body 2, for easy understanding. Alternatively, ink images IM may be continuously transferred onto a plurality of recording media P through one turn of the transfer body 2.

A flow of a process performed by the recording system 1 according to this embodiment will be described with reference to FIG. 10.

First, in step S1101, recording for maintenance is started in response to acceptance of an input for selecting a maintenance type, as desired, and providing an instruction by a user using the operation unit 133. In this embodiment, a description will be given assuming that HS maintenance for generating an HS table, which is used in the HS processing unit 904 of the image processing unit 134 described above, is selected.

Then, in step S1102, the recording system 1 records a maintenance pattern for HS maintenance. In HS processing, as described above, density variations that depend on the nozzle characteristics, such as the amount of ejection, are corrected. The HS maintenance pattern is a pattern image based on image data for each color having the same width as that of the nozzle arrays of the recording heads 30 in the Y direction (FIG. 2) and having uniform density. It is desirable to record a plurality of gradations in the X direction. In this case, the recording operation is as described above with reference to FIG. 5.

Then, in step S1103, information indicating whether to read a recorded product in the subsequent step is obtained. The information indicating reading or non-reading may be associated with data of the pattern recorded in S1102, or may be associated with the type of maintenance selected by the user using the operation unit 133. The HS maintenance pattern is read to generate a correction parameter. Thus, information indicating reading is obtained.

Then, in step S1104, the recording system 1 performs determination in accordance with the obtained information indicating reading or non-reading. Since the HS maintenance pattern is to be read, the process proceeds to S1105.

Then, in step S1105, the recording system 1 performs post-processing using parameters for reading. In the post-processing, the post-processing unit 10A is assumed to perform the surface glossing process described above. In the parameters for reading, the pressure to be applied is 5 kgf/cm$^2$, and the time period during which the HS maintenance pattern is nipped between rollers is 900 msec. These parameters are obtained in advance by reading the parameters for a recorded product to be read, which are stored in the storage unit 132 or the like.

Then, in step S1107, the inspection unit 9B reads the HS maintenance pattern. Then, the recording system 1 generates an HS table in accordance with the result of reading. The generated table is used by the HS processing unit 904 of the image processing unit 134 described above to perform conversion to obtain image data for recording with uniform density to address density variations caused by the characteristics of each nozzle, such as the amount of ejection.

Then, in step S1108, the recording system 1 finishes the maintenance.

In contrast, a flow of a normal recording process for recording, instead of a maintenance pattern, an actual image owned or designated by a user, such as a picture or a document image, will be described. When a user replaces a recording medium or when the recording system 1 resumes from long-term suspend mode, the recording system 1 may first execute HS maintenance and then record an actual image after completion of the HS maintenance.

First, in step S1101, the flow is started. The user inputs the desired document data together with an instruction for recording to the recording system 1, and the recording system 1 accepts the document data and the instruction and then starts a recording process. As described above, when the user transmits the document data from the host device HC1 to the higher-level device HC2 and image data generated by the higher-level device HC2 is transmitted to the control unit 13, a recording operation for recording the image data is started.

Then, in step S1102, the image based on the document data input by the user is recorded. In this case, the recording operation is as described above with reference to FIG. 5.

Then, in step S1103, information indicating whether to read a recorded product in the subsequent step is obtained. The information indicating reading or non-reading may be provided by the higher-level device HC2 in association with a job recorded in S1102, or may be provided in accordance with a recording mode determined by the higher-level device HC2. The recording mode is a mode determined by designating a type of sheet, recording quality, the number of inks used, or the like. When a maintenance pattern is recorded every predetermined number of recorded copies or at a predetermined timing, information indicating reading may be provided only when a maintenance pattern is recorded. Since a document image input from the user is recorded, information indicating non-reading is obtained.

Then, in step S1104, the recording system 1 performs determination in accordance with the information indicating reading or non-reading. Since the recorded product is not to be read, the process proceeds to step S1106.

Then, in step S1106, the recording system 1 performs post-processing using parameters for non-reading. In the post-processing, the post-processing unit 10A is assumed to perform the surface glossing process described above. The pressure to be applied is 10 kgf/cm$^2$, and the time period during which the image is nipped between rollers is 900 msec. These parameters are obtained in advance by reading the parameters for a recorded product not to be read, which are stored in the storage unit 132 or the like.

Then, in step S1108, the process ends.

As described above, the pressure applied to a recorded product to be read during post-processing is less than the pressure applied to a recorded product not to be read during post-processing. Thus, the level of the pressure applied to a recorded product to be read during post-processing can be lower than the level of the pressure applied to a recorded product not to be read during post-processing. This can reduce the curl of a recorded product to be read, resulting in an improvement in the accuracy of reading a signal value.

In this embodiment, the application of a pressure is controlled by, but not limited to, using a nip pressure of pressure-applying rollers. For example, the temperature of a pressure-applying unit may be controlled to allow the pressure-applying unit to thermally expand or contract, and the pressure-applying unit may be controlled to change the pressure.

The maintenance pattern is not limited to an HS maintenance pattern, and may be a pattern for detecting ejection or a pattern used to adjust energy for ejection.

Second Embodiment

Still referring to FIG. 10, a second embodiment will be described. In the first embodiment, the pressure applied to a recorded product to be read during a surface glossing process as post-processing is lower than the pressure applied to a recorded product not to be read during a surface glossing process, thereby changing the level of the pressure to be applied in two cases. In this embodiment, a pressure is applied to a recorded product to be read during post-processing for a longer time than a recorded product not to be read during post-processing, thereby changing the level of the pressure to be applied to the recorded products. The same portions as those in the first embodiment will not be described.

First, when an instruction for HS maintenance is input from the operation unit 133 in step S1101, in the parameters for reading, which are obtained in step S1105, the pressure to be applied is 10 kgf/cm$^2$, and the time period during which the maintenance pattern is nipped between rollers is 500 msec.

In a normal recording process for recording, instead of a maintenance pattern, an actual image owned or designated by a user, such as a picture or a document image, in contrast, in step S1101, the recording system 1 accepts the input of document data desired by the user and an instruction for recording. In this case, in the parameters for non-reading, which are used in step S1106, the pressure to be applied is 10 kgf/cm$^2$, and the time period during which the image is nipped between rollers is 900 msec.

Other portions are the same as those in the first embodiment.

As described above, in this embodiment, the time period during which a pressure is applied to a recorded product to be read during post-processing is shorter than the time period during which a pressure is applied to a recorded product not to be read during post-processing, thereby changing the level of the pressure to be applied in two cases. This can reduce the curl of a recorded product to be read, resulting in an improvement in the reading accuracy. In addition, the first embodiment and the second embodiment may be used in combination. In this embodiment, a recorded product to be read may be subjected to post-processing under a lower pressure for a shorter time than a recorded product not to be read when subjected to post-processing.

Third Embodiment

In the embodiments described above, the level is changed during a surface glossing process as post-processing. In this embodiment, no surface glossing process is performed on a recorded product to be read. This can also reduce the curl of a recorded product to be read, improving the reading accuracy. This will be described hereinafter. The same portions as those in the first embodiment will not be described.

First, when an instruction for maintenance is input from the operation unit 133 in step S1101, in the parameters for reading, which are obtained in step S1105, no pressure is applied. In the operation of the recording system 1, the conveying cylinder 8 and the fixing belt 801 illustrated in FIG. 8 are spaced apart from each other so as to apply no pressure. Alternatively, the maintenance pattern may be conveyed to the inspection unit 9B along another conveyance path that does not pass through the post-processing unit 10A, and may be read.

In a normal recording process for recording, instead of a maintenance pattern, an actual image owned or designated by a user, such as a picture or a document image, in contrast, in step S1101, the recording system 1 accepts the input of document data desired by the user and an instruction for recording. In this case, in the parameters for non-reading, which are used in step S1106, the pressure to be applied is 10 kgf/cm$^2$, and the time period during which the image is nipped between rollers is 900 msec.

Other portions are the same as those in the first embodiment.

As described above, in this embodiment, no surface glossing process is performed on a recorded product to be read, and thus no pressure is applied to the recorded product during post-processing. This can reduce the curl of a recorded product to be read, resulting in an improvement in the reading accuracy.

Figure 10:
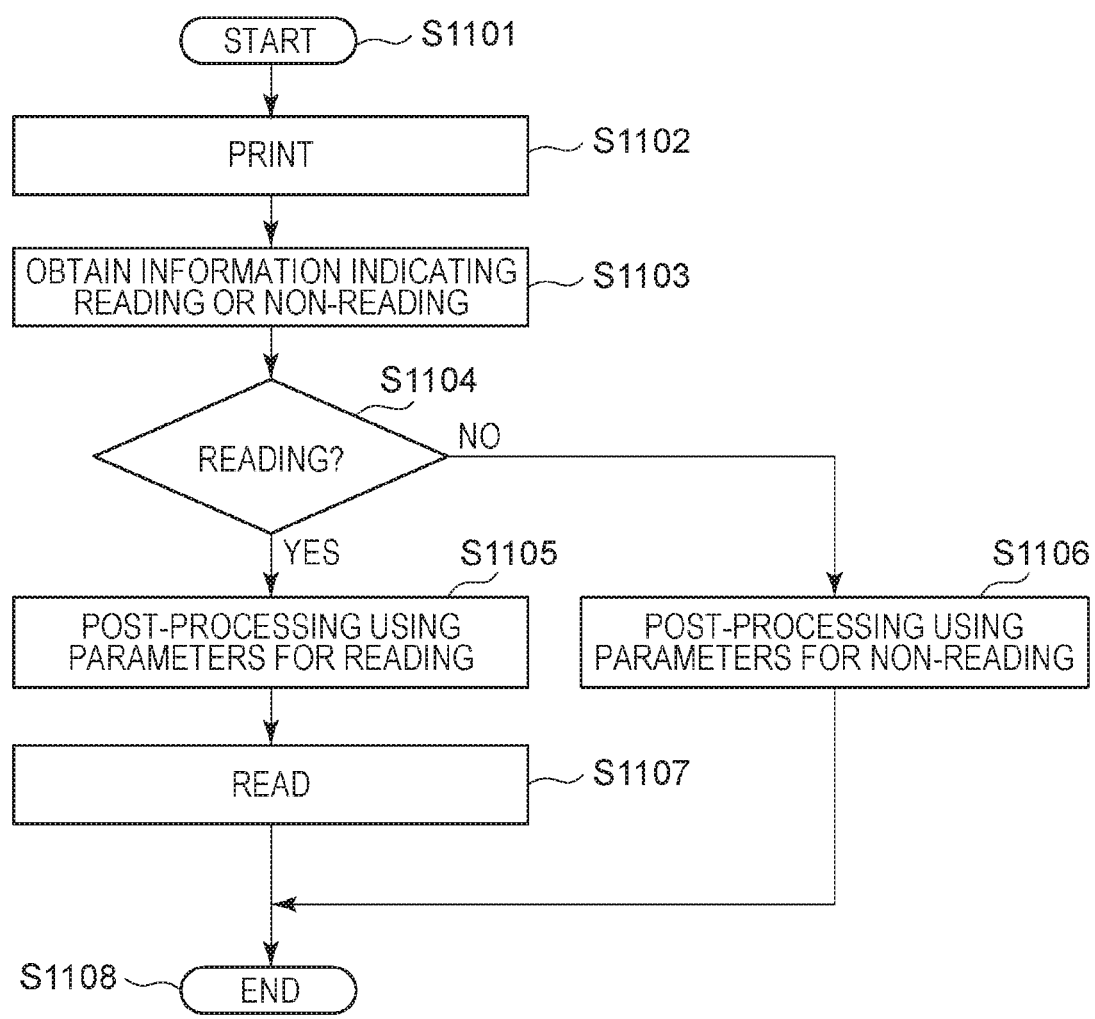
FIG. 10 is a flowchart illustrating a process flow according to an embodiment.

FIGS. 11A to 11D are diagrams illustrating the order of the units through which a recording medium passes to execute the process illustrated in FIG. 10 in the first to third embodiments. Solid lines indicate the flow of a recorded product to be read, and broken lines indicate the flow of a recorded product not to be read.

Figure 11A:
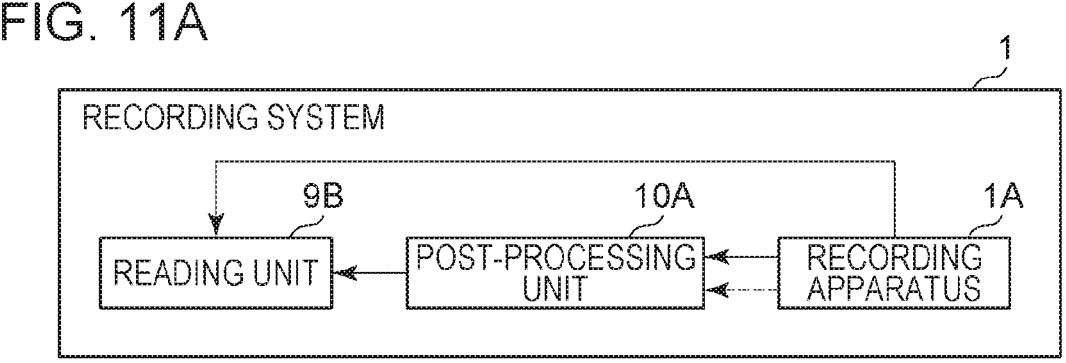
FIGS. 11E to 11D are schematic diagrams illustrating process flows according to embodiments.

FIG. 11A illustrates the order of the units described in the first to third embodiments. When a recorded product to be read is recorded by the recording apparatus 1A, as indicated by a solid line, the post-processing unit 10A applies a pressure to the recorded product and then conveys the recorded product to the inspection unit 9B (hereinafter referred to also as "reading unit 9B"). Alternatively, as indicated by another solid line, the recorded product may be conveyed, with the rollers released in the post-processing unit 10A, or may be conveyed to the reading unit 9B along another conveyance path without passing through the post-processing unit 10A. A recorded product not to be read is conveyed from the recording apparatus 1A to the post-processing unit 10A to apply a pressure to the recorded product, as indicated by the broken line.

Other Embodiments

Figure 11B:
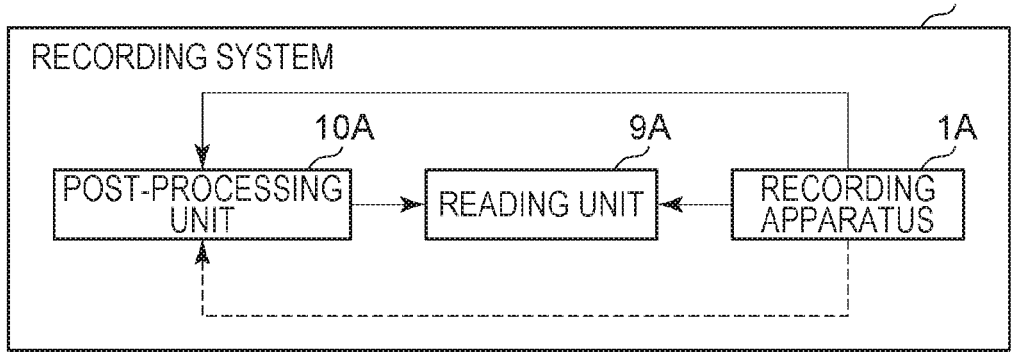

FIG. 11B illustrates the order of the reading unit and the post-processing unit, which is opposite to the order described with reference to FIG. 11A. With the use of the inspection unit 9A (hereinafter referred to also as "reading unit 9A") illustrated in FIG. 1, instead of the reading unit 9B, and the post-processing unit 10A, processing can be performed in the order illustrated in FIG. 11B. When a recorded product to be read is recorded by the recording apparatus 1A, as indicated by a solid line, the post-processing unit 10A applies a pressure and then conveys the recorded product to the reading unit 9A in reverse order. Alternatively, as indicated by another solid line, the recorded product may be conveyed directly to the reading unit 9A. As indicated by the broken line, a recorded product not to be read may be conveyed to the post-processing unit 10A along another conveyance path that does not pass through the reading unit 9A, or may pass through the reading unit 9A without being read. Other portions are the same as those in the first to third embodiments.

Figure 11C:
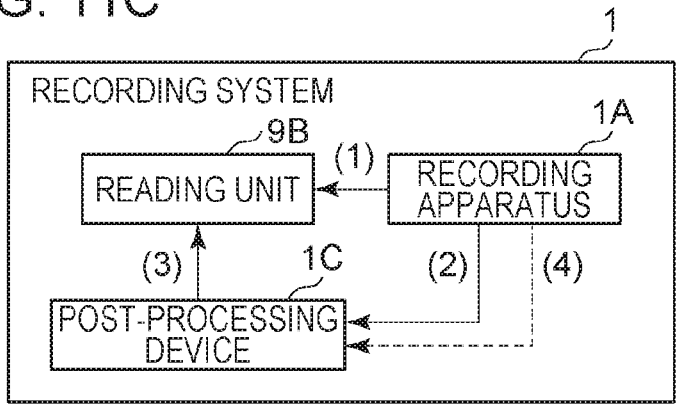

FIG. 11C illustrates an embodiment in which the conveying device 1B includes no post-processing unit, but a post-processing device having the same function as the post-processing unit 10A is external to the conveying device 1B. That is, the recording system 1 includes the recording apparatus 1A, the conveying device 1B, and a post-processing device 1C. Also in this embodiment, when a recorded product to be read is recorded by the recording apparatus 1A, as indicated by solid line (1), the recorded product is read by the reading unit 9B. Alternatively; as indicated by solid line (2), the external post-processing device 1C may apply a pressure to the recorded product. Then, the recorded product may be input again to the recording system 1 (solid line (3)) and read by the reading unit 9B. As indicated by broken line (4), when a recorded product not to be read is recorded by the recording apparatus 1A, the external post-processing device 1C applies a pressure to the recorded product. When the post-processing device 1C performs processing, the recorded product is conveyed to the post-processing device 1C along a conveyance path (not illustrated) via which the chain 8c and the external post-processing device 1C communicate. Other portions are the same as those in the first to third embodiments.

Figure 11D:
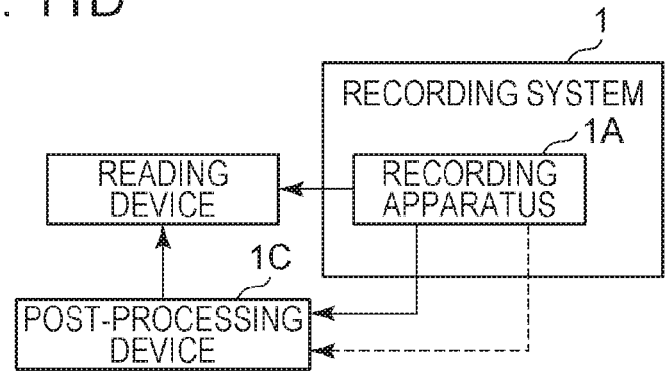

FIG. 11D illustrates an embodiment in which the recording system 1 includes no post-processing unit or reading unit, but an external post-processing device 1C and an external reading device are attached to the recording system 1. Also in this embodiment, when a recorded product to be read is recorded by the recording apparatus 1A, as indicated by a solid line, the recorded product is read by the external reading device. Alternatively, as indicated by another solid line, the external post-processing device 1C may apply a pressure to the recorded product, and then the recorded product may be read by the external reading device. When a recorded product not to be read is recorded by the recording apparatus 1A, as indicated by the broken line, the external post-processing device 1C applies a pressure to the recorded product. Other portions are the same as those in the first to third embodiments.

The inspection unit 9B has been described as a CCD scanner having the mirror 704, by way of example. Alternatively, the inspection unit 9B may be a contact image sensor (CIS) scanner that does not include the mirror 704. A flatbed scanner, a line scanner, an area sensor camera, or a line sensor camera may be used as a reading unit.

A recorded product to be read has been described as a maintenance pattern for HS maintenance, by way of example. However, any pattern to be read may be used even if the pattern is used for other purposes. Examples of the pattern include a non-ejection detection pattern for detecting non-ejection from a nozzle, a registration adjustment pattern for detecting and correcting the ejection timing of a nozzle, and a conveyance amount correction pattern for detecting and correcting the amount of conveyance of a recording medium.

In the embodiments described above, the recording unit 3 includes the plurality of recording heads 30. Alternatively, the recording unit 3 may include a single recording head 30. A mechanism for conveying the recording medium P may be of any other type such as a type in which the recording medium P is conveyed while being held between a roller pair. In the type in which the recording medium P is conveyed while being held between a roller pair, a rolled sheet may be used as the recording medium P. The rolled sheet may be cut after transfer to produce a recorded product P'.

In the embodiments described above, the transfer body 2 is disposed on the outer peripheral surface of the transfer cylinder 41. Alternatively, the transfer body 2 may be of any other type. For example, the transfer body 2 may be formed into an endless band shape so as to be allowed to cyclically travel.

A process for controlling each unit of a recording apparatus according to this embodiment may be feasible by providing a program that implements one or more functions in the embodiments described above to a system or device via a network or a storage medium and reading and executing the program by using one or more processors in a computer in the system or device. The process may also be feasible by a circuit (e.g., an application-specific integrated circuit (ASIC)) that implements one or more functions.

According to embodiments of the present disclosure, it may be possible to obtain a glossy recorded product and to accurately read a recorded product while improving the gloss of the recorded product.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-139503, filed Jul. 25, 2018, which is hereby incorporated by reference herein in its entirety.

What is claimed is:

1. A recording apparatus comprising:
   a recording unit configured to apply ink onto a recording medium to form an ink image on the recording medium;
   a post-processing unit configured to apply a pressure to the recording medium having an ink image formed by the recording unit to perform post-processing for improving a gloss of the ink image on the recording medium; and
   a reading unit configured to read a recording medium having an ink image,
   wherein
   the post-processing unit applies a pressure to a recording medium, having the ink image formed by the recording unit, not to be read by the reading unit, and
   the post-processing unit applies no pressure to the recording medium, having an ink image formed by the recording unit, to be read by the reading unit.

2. The recording apparatus according to claim 1, wherein the recording medium to be read by the reading unit comprises a maintenance pattern that is used for maintenance of the recording unit.

3. The recording apparatus according to claim 2, wherein the recording unit includes a plurality of nozzles each configured to eject ink,
   the maintenance pattern is formed by ejection of ink from each of the plurality of nozzles, and
   the recording apparatus further comprises a correction unit configured to correct image data on the basis of a result of reading the maintenance pattern by the reading unit to reduce image density variations in a direction in which the plurality of nozzles are arranged.

4. The recording apparatus according to claim 1, further comprising:
   a recording unit including a transfer body configured to hold an ink image formed by ink; and
   a transfer unit configured to transfer the ink image from the transfer body to the recording medium conveyed by a conveying unit.

5. The recording apparatus according to claim 4, wherein the post-processing unit applies a pressure to the recording medium having the ink image transferred thereto by using a roller.

6. The recording apparatus according to claim 4, wherein the post-processing unit heats the recording medium having the ink image transferred thereto while applying a pressure to the recording medium having the ink image transferred thereto, and then cools the heated recording medium.

7. A recording method using a recording apparatus including a recording unit configured to apply ink onto a recording medium to form an ink image, a post-processing unit configured to apply a pressure to the recording medium, and a reading unit configured to read a recording medium, the recording method comprising:
   a pressure-applying step of applying a pressure to the recording medium having the ink image, to perform post-processing for improving a gloss of the ink image on the recording medium by the post-processing unit,
   an outputting step of outputting the recording medium on which the post-processing is performed without reading the recording medium by the reading unit to which the pressure has been applied in the pressure-applying step, wherein the recording method further comprises:

a recording step of recording an image onto a recording medium by applying ink onto the recording medium by the recording unit; and a reading step of reading the recording medium, having the image, to which the post-processing unit has applied no pressure for the post-processing, by the reading unit.

8. A recording apparatus comprising:

a recording unit configured to apply ink onto a recording medium to form an ink image on the recording medium;

a post-processing unit configured to apply a pressure to the recording medium, having an ink image formed by the recording unit to perform post-processing for improving a gloss of the ink image on the recording medium; and a reading unit configured to read a recording medium having an ink image, wherein the post-processing unit applies a pressure to a recording medium, having the ink image formed by the recording unit, not to be read by the reading unit, and the post-processing unit applies no pressure to the recording medium, having an ink image formed by the recording unit, to be read by the reading unit.

9. A recording apparatus comprising:

a recording unit configured to apply ink onto a recording medium to form an ink image on the recording medium;

a post-processing unit configured to apply a pressure to the recording medium, having an ink image formed by the recording unit to perform post-processing for improving a gloss of the ink image on the recording medium; and a reading unit configured to read a recording medium having an ink image, wherein the post-processing unit applies a pressure to a recording medium, having the ink image formed by the recording unit, not to be read by the reading unit, and the post-processing unit applies, to the recording medium to be read by the reading unit, a lower pressure than the pressure applied to the recording medium not to be read by the reading unit.

10. A recording apparatus comprising:

a recording unit configured to apply ink onto a recording medium to form an ink image on the recording medium;

a post-processing unit configured to apply a pressure to the recording medium, having an ink image formed by the recording unit to perform post-processing for improving a gloss of the ink image on the recording medium; and a reading unit configured to read a recording medium having an ink image, wherein the post-processing unit applies a pressure to a recording medium, having the ink image formed by the recording unit, not to be read by the reading unit, and the post-processing unit applies a pressure to the recording medium to be read by the reading unit for a shorter time than to the recording medium not to be read by the reading unit.

* * * * *